Figure 1:
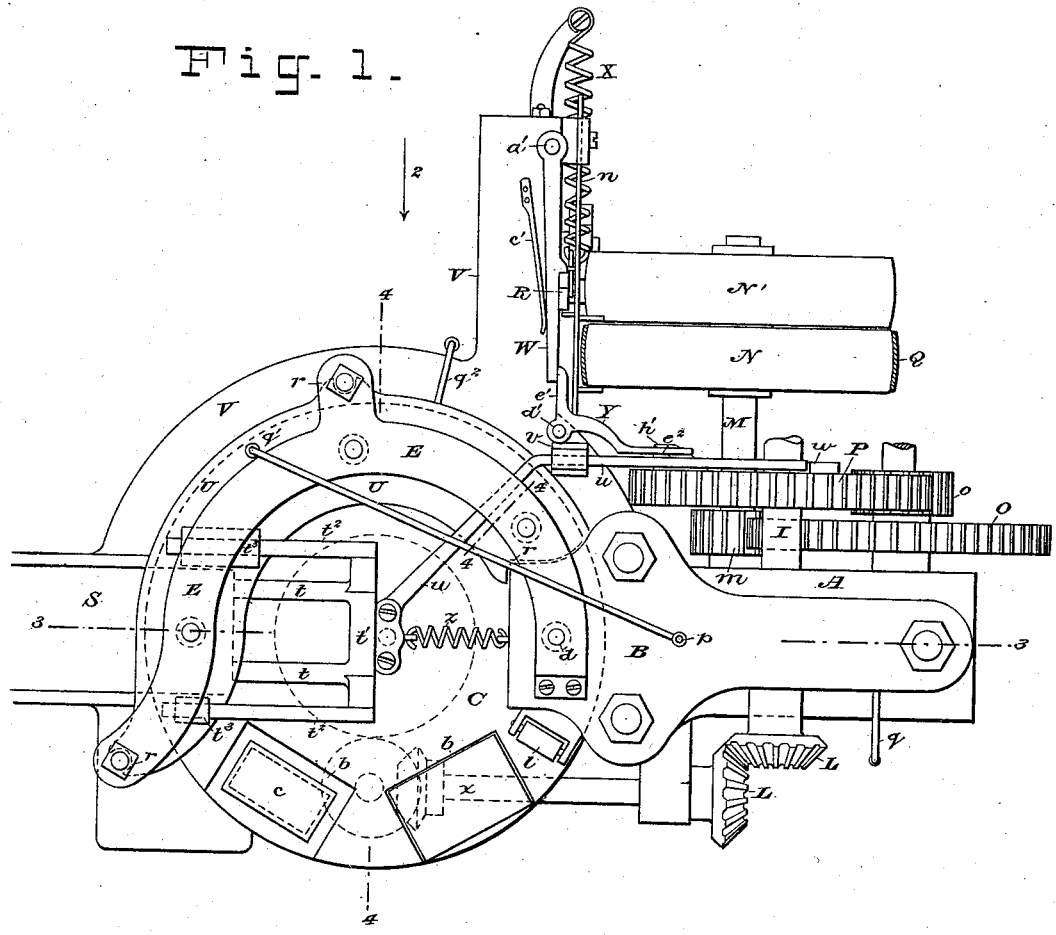

(No Model.)　　　　　　　　　　　　　　　　　4 Sheets—Sheet 1.
J. NAYLOR.
MOLDING ARTICLES UNDER PRESSURE FROM PLASTIC MATERIALS.
No. 372,758.　　　　　　　　　　Patented Nov. 8, 1887.

WITNESSES:　　　　　　　　　　　　　　　　INVENTOR:
　　　　　　　　　　　　　　　　　　　　　Joseph Naylor
　　　　　　　　　　　　　　　　　　　　By his Attorney, (No Model.)

4 Sheets—Sheet 2.

J. NAYLOR.

MOLDING ARTICLES UNDER PRESSURE FROM PLASTIC MATERIALS.

No. 372,758. Patented Nov. 8, 1887.

WITNESSES:
E. B. Bolton
J. D. Haslinger.

INVENTOR:
Joseph Naylor
By his Attorney,
Henry Connett (No Model.) 4 Sheets—Sheet 3.

J. NAYLOR.

MOLDING ARTICLES UNDER PRESSURE FROM PLASTIC MATERIALS.

No. 372,758. Patented Nov. 8, 1887.

WITNESSES:
E. B. Bolton
J. B. Maplinger

INVENTOR:
Joseph Naylor
By his Attorney,
Henry Connett (No Model.) 4 Sheets—Sheet 4.

J. NAYLOR.
MOLDING ARTICLES UNDER PRESSURE FROM PLASTIC MATERIALS.

No. 372,758. Patented Nov. 8, 1887.

WITNESSES:
E. B. Bolton
J. O. Caplinger

INVENTOR:
Joseph Naylor
By his Attorney,
Henry Connett

UNITED STATES PATENT OFFICE.

JOSEPH NAYLOR, OF BLOOMFIELD, NEW JERSEY.

MOLDING ARTICLES UNDER PRESSURE FROM PLASTIC MATERIALS.

SPECIFICATION forming part of Letters Patent No. 372,758, dated November 8, 1887.

Application filed November 26, 1886. Serial No. 219,929. (No model.)

*To all whom it may concern:*

Be it known that I, JOSEPH NAYLOR, a citizen of the United States, and a resident of Bloomfield, in the county of Essex and State of New Jersey, have invented certain Improvements in Molding Articles under Pressure from Plastic Materials, of which the following is a specification.

My invention relates to the molding under pressure of articles such as buttons, rosettes, &c., from plastic materials.

So far as my novel method of molding is concerned the object is to avoid relieving the mold or die from pressure until the plastic material therein shall have become sufficiently cooled and set to permit of the said mold or die being opened without injury to the articles molded, and yet to allow the press to be used continuously and without the necessity of waiting for the mold or die to cool. In the ordinary method of molding hot plastic materials the die or mold is filled and placed in the press, where it is submitted to great pressure and allowed to remain under this pressure until comparatively cool and the plastic material has become hard. If the mold be removed at once the cap-plate or upper half of the mold will rise a little from relaxation of pressure and injure or destroy the articles molded. I obviate this by bringing the filled mold into the press, then pressing it, submitting it in some cases to from fifty to sixty tons pressure, and then removing it at once from the press while still under a sufficient but diminished pressure—say of eight hundred pounds—under which pressure it remains until sufficiently cooled to be entirely relieved of pressure. Thus I am enabled to use the press on molds in rapid succession, and without the necessity of waiting until each mold cools before removing it. In order to accelerate the cooling of the molds, I also refrigerate them during the pressing operation and while they are under the diminished after-pressure, and before the pressure on them is entirely removed.

Another object of my invention is to provide a machine that shall operate automatically in carrying out the above-described method of molding. This machine carries the mold or die, which may be of the usual kind, into a press, presses it, carries it on and out from the press, but maintains it under a reduced pressure sufficient for the purpose, replaces it in the press by another charged mold or die, and finally discharges it.

Another but secondary object of my invention is to provide a mechanism for automatically shifting the belt or clutch and stopping the machine after a pressing operation, in order that the workman may have time to place a prepared die on the carrier-table while the machine is at rest. Thus the workman is compelled, when this device is employed, to set the machine in motion after each pressing operation, but it will stop of itself.

My invention will be hereinafter fully described, and its novel features carefully defined in the claims.

Figure 2:
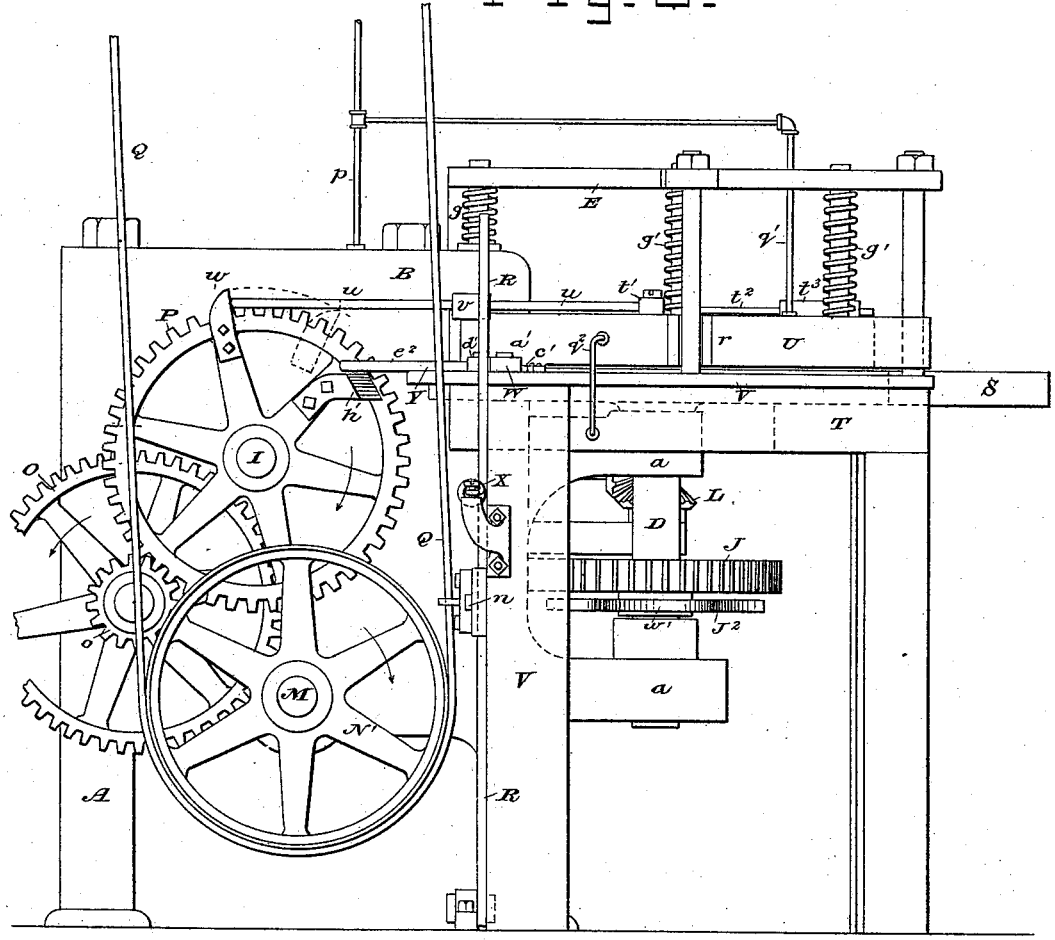
Figure 3:
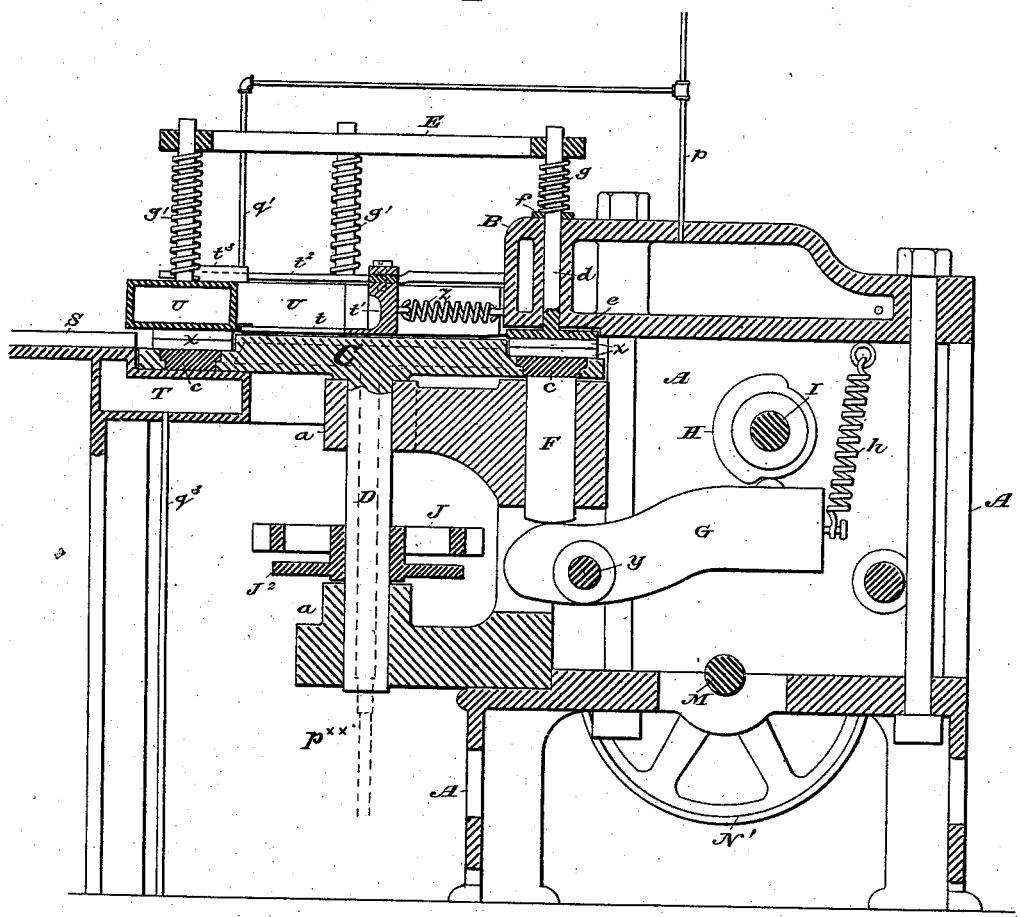
Figure 5:
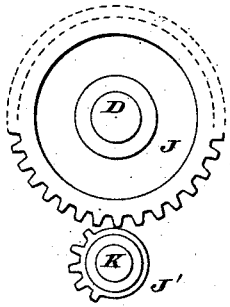
Figure 4:
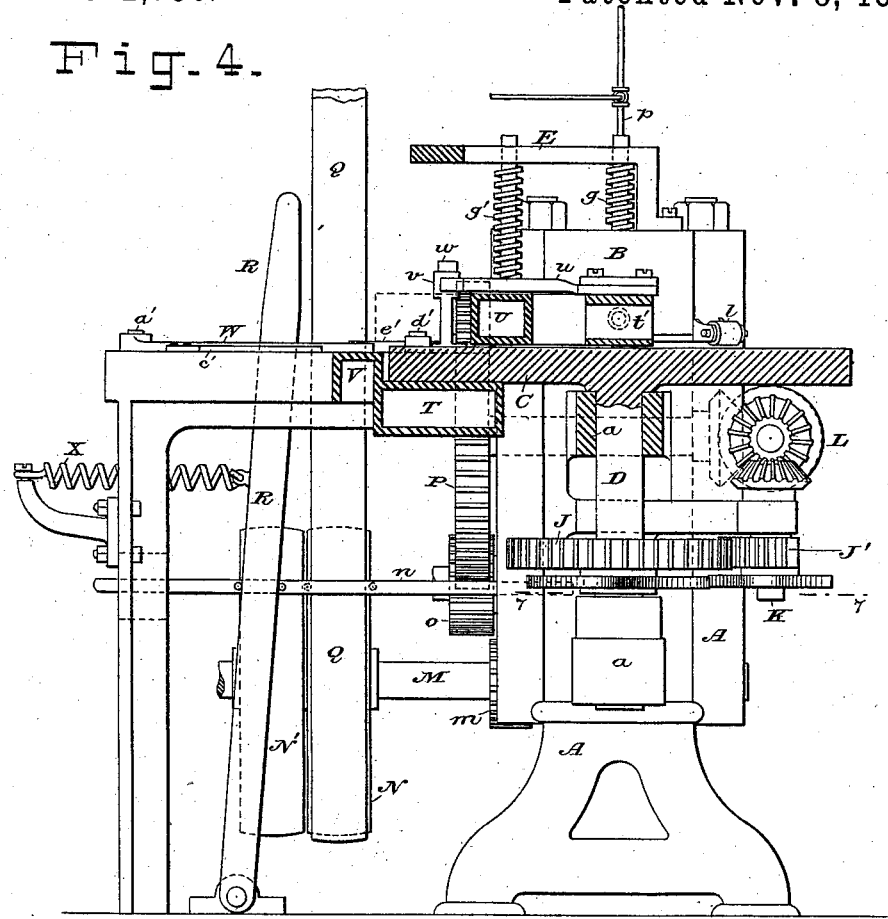
Figure 7:
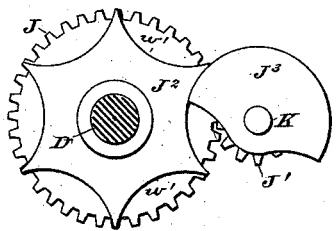

In the drawings, which serve to illustrate my invention, Figure 1 is a plan of a machine embodying my invention. Fig. 2 is a side elevation of the said machine, the view being taken from the direction indicated by arrow 2 in Fig. 1. Fig. 3 is a vertical sectional elevation of said machine, the plane of the section being indicated by line 3 3 in Fig. 1. Fig. 4 is a sectional elevation of the front end of the machine, the plane of the section being indicated by line 4 4 in Fig. 1. Fig. 5 is a view showing the gears for giving an intermittent rotary motion to the carrier-table. Fig. 6 is a plan view of the carrier-table detached. Fig. 7 is a plan view of the device for holding the carrier-table fast or locking it against accidental movement.

Let A represent the main frame of the machine, which will usually be of cast-iron and quite strong and heavy. On this frame, and bolted firmly thereto, is the press-head B.

C is the carrier-table, which is usually circular in form. This table is rotatively mounted, having an axis, D, provided with bearings at *a a* in brackets projecting from frame A. This table C has formed in its upper face, at equal distances apart, a number of die-recesses, *b b*, which are open to the periphery of the table, so that the dies may be pushed off the table horizontally without having to be lifted out. The number of these recesses will depend upon circumstances. In the present machine six are employed. Each die-recess *b* has a loose bottom plate, *c*, rabbeted at its edges, so as to fit in flush with the bottom of the recess, and yet be supported at its margin.

I usually make this plate nearly as large as the bottom of recess $b$.

$x$ represents the die or mold resting in its recess $b$. These are or may be constructed in the usual manner of two parts—a base and a cap. When the table C is revolved on its vertical axis, a die resting in a recess is brought under press-head B. On the lower end of a stem, $d$, which extends down through the press-head B, is fixed a pressure-plate, $e$, which rests on the die while the pressure is being brought upon the latter. On the upper part of stem $d$ is a collar, $f$, which allows plate $e$ to stand a little off from the lower face of head B, and above this collar, on the stem $d$, is a strong spring, $g$, which abuts against a fixed bar, E, over the machine-frame. The function of this device will be hereinafter explained.

F is the press-follower, which is mounted in vertically-arranged guides in the frame A and directly under the head B. The edge of table C, carrying the dies, passes between this follower and presser-plate $e$.

G is a stout lever fulcrumed at $y$, the shorter end of which takes under follower F, and the longer end of which takes under and is acted upon by a cam, H, in a cam-shaft, I, rotatively mounted in frame A. Every revolution of cam H acts to impart an upward movement to follower F, and after the cam has passed, a spring, $h$, or some other equivalent mechanism, lifts the longer end of the lever and allows the follower to fall or be retracted by gravity.

The mechanism for imparting intermittent rotation to table C comprises a toothed wheel, J, on the axis D of the table and a mutilated pinion, J′, on a shaft, K, rotatively mounted in brackets on the frame A. The wheel J, as here shown, has thirty teeth, and the pinion J′ has fifteen teeth; but all of these teeth are removed except five, as seen in Fig. 5. The wheels J J′ gear together, and pinion J′ is driven from the cam-shaft I through the medium of miter-gears L L. Thus every revolution of the shaft I will rotate the table C through one-sixth of a revolution, and the table will then stand for a period twice as long as that occupied in its movement. The cam H may be made to hold the die under pressure for nearly the whole of this period of rest of the table C.

As the cap of die $x$ may stand a little too high when the die is placed on the table, owing to haste on the part of the workman or from other causes, I find it desirable to mount on the head B in the path of the die a roller, $l$, under which the die must pass. This roller will press down the die-cap to its proper level before the die passes under the head. This is a precautionary device.

M is the driving or counter shaft, on which are mounted a tight pulley, N, and a loose pulley, N′. On shaft M is a pinion, $m$, which meshes with a spur-wheel, O, and on the same axis with wheel O is a pinion, $o$, which meshes with a spur-wheel, P, on the cam-shaft I.

Q is the driving-belt, and $n$ represents any ordinary belt-shifter—in this case a sliding rod with pins to embrace the belt on one side and similar pins to embrace the shifting-lever R on the other side.

So far as described the operation is as follows: The machine being set in motion the workman places a filled die, $x$, in a die-recess, $b$, and the rotation of table C carries the die under head B. Pinion J′ now moves out of engagement with wheel J, and table C ceases to rotate. At this moment cam H acts on lever G and drives upward the follower or ram F, thus pressing the die upward against pressure-plate $e$. This plate moves up, compressing spring $g$ until plate $e$ comes to bear against the lower face of head B. This is the limit of the stroke. The cam holds the die thus under pressure until pinion J′ has rotated nearly far enough to again engage wheel J, when said cam passes the lever and allows the follower F to descend. The pressure-plate $e$ is now free to descend also under the pressure of spring $g$, and the die $x$ is pressed back into its recess. The adjustment of the several parts is such that when the die moves into position under head B it may pass under plate $e$ without touching it, and the function of this plate is to hold the die under a diminished, but sufficient, pressure after the greater pressure brought upon it by the follower or ram has been taken off. After the pressing operation, the die passes on, and another die is brought into position under the head by the next rotary movement of table C. As the plastic materials usually employed are only plastic when hot and become hard on cooling, I provide means, first, for refrigerating the dies before they are delivered from the machine, and, second, for maintaining them under pressure during this refrigeration. This construction I will now describe.

I make the head B of the machine hollow, and provide it with a pipe, $p$, for the admission of cold water thereto, and a pipe, $q$, for the water to flow out or drain therefrom. Thus the water in said head is maintained at all times at a low temperature. I also arrange under that portion of the table carrying the hot dies—namely, between the head B and the delivery trough or way, S—a water-chamber, T, of any form, and this I also provide with a water inlet and outlet, the same as the head B. Over this part of the table C, I arrange a water-chamber, U, which is free to play up and down in suitable guides, and this chamber is likewise provided with a water-inlet pipe, $q'$, and a water-outlet pipe, $q^2$, leading to chamber T. The pipe $q^3$ is the outlet from chamber T. I will say here that it is not important how the head B and chambers U and and T are supplied constantly with cold water. Any system of pipes, either independent or connected, will serve.

The water-chamber U is kept pressed normally down upon the dies, which move under it by strong springs $g'$ $g'$, which abut against the bar E. The movement of chamber U will be almost imperceptible, and need not be taken into account in connecting the water-pipes therewith. It may be guided in any way; but I usually guide it at the points $r$ $r$ on the supports for the bar E and on the head B. It is prevented by stops from descending to and pressing on the table C, and is slightly rounded or beveled at the end where the dies pass from the press-head under it, so that the first die will raise it a very little as it passes under it; but when the machine is once in full operation there will always be at least two dies under it constantly, and these will uphold it. As the dies pass around from the head B to the discharging-point, one die will be brought under the head for pressing as another is brought opposite to the trough or way S; and while the table C is at rest this latter die will be discharged by mechanism which I will now describe.

The die $x$, when in its recess $b$, projects a little way above the general level of table C. I take advantage of this to provide a "pusher" for pushing the dies off the table and into the trough or way S. This pusher comprises two (one or more may be used) prongs, $t$, connected by a head, $t'$, with two other guide-prongs, $t^2$, which play in guide-bearings $t^3$, mounted on chamber U. The prongs $t$ are flat and thin and play over the upper surface of table C, and through ways cut or formed in the under side of chamber U. If the dies project far enough above the general level of the table, however, room enough for these pushers will be provided without the necessity of forming ways in the chamber U. The head $t'$ of the pusher is connected rigidly to a pusher-rod, $u$, which has a sliding bearing in a post, $v$, and is bent or made angular, so as to bring its free end into the plane of a block or cam, $w$, on the face of gear-wheel P. When the table has ceased to rotate for a time and during the pressing operation, block $w$ acts on the end of rod $u$, and through it on the pusher-prongs $t$, to push the die opposite to their ends out off the table and into the trough S. When the block $w$, by the continued rotation of wheel P, has passed below and out of the plane or path in which rod $u$ plays, a spring, $z$, retracts the pusher. This pusher is susceptible of considerable modification mechanically, and I do not limit myself to the particular construction here shown.

When the pinion J' disengages from wheel J and table C ceases to rotate, it is important that said table should be locked or held against moving for the time in order to guard against accidents. I will now describe the table-locking device I prefer to employ, referring particularly to Fig. 7. Fixed on the table-axis D is a disk, $J^2$, having six concave recesses, $w'$, formed in its periphery, and fixed on the axis K of pinion J' is a segment-disk, $J^3$, having a convex periphery which fits the concavities $w'$ in disk $J^2$. When the teeth on pinion J' have passed out of engagement with the teeth of wheel J and the latter has ceased to rotate, the disk $J^3$ will have engaged one of the concavities $w'$, and this will prevent the table from revolving and hold it steady during the pressing operation. Any automatic locking device may be employed in lieu of this.

In addition to the refrigerating-chambers T and U, I can also form a chamber in the table C to receive cold water. This chamber may be supplied with water, and circulation therein maintained through a hollow in the table-axis D. This construction is sufficiently illustrated by dotted lines at $p^{\times\times}$ in Fig. 3.

I will say here in explanation of Fig. 4 that the general plane of the section in this view is through the axis of table C; but in order that the chamber U should not obscure the parts behind it (at the left) I have cut the section through it in the plane indicated by the short broken line 4 4 in Fig. 1. I will also say that in practice the machine will be surrounded by a wooden bench or table for the convenience of the workman; but this I have omitted for the sake of clearness. The outside bearings of shafts M and I and that carrying wheel O have also been omitted. These shafts will, however, usually have such bearings.

I will now describe the device before referred to for shifting the belt at each pressing operation, premising that this mechanism may or may not be employed. The belt-shifting lever R, which may be fulcrumed at the floor or at any point desired, stands beside and plays along the edge of a table, V, herein shown as formed in one with the chamber T and trough S. On this table is mounted to play or swing horizontally a latch-lever, W, pivoted at $a'$. This latch-lever has a shoulder, $b'$, which takes behind the shifting-lever R and holds it in position to keep the belt Q on the tight pulley N. The latch-lever has a latch-spring, $c'$, of any kind, and the shifting-lever R has a strong spring, X, which pulls it over when said lever is freed, and thus automatically shifts belt Q onto the loose pulley N'. By pushing back the free end of latch-lever W until its shoulder $b'$ is free of lever R spring X will instantly shift the belt and stop the machine. This is automatically effected by a bell-crank lever, Y, pivoted at $d'$ on table V, one arm, $e'$, of which overlaps and stands in front of the end of lever W, and the other arm, $e^2$, of which stands in the path of a wedge-like cam or incline, $h'$, fixed to the side of wheel P. As the wheel P revolves, this cam $h'$ takes behind and pushes arm $e^2$ outward, and consequently arm $e'$ moves backward, thus moving lever W backward and releasing the shifting-lever R. The cams H, $w$, and $h'$ will be set, respectively, so as to act at the proper times, and the pinion J' will be set also so as to be out of engagement with wheel J when the cams are acting.

Having thus described my invention, I am fully aware that some variation and modification may be effected in my machine without any material departure from the spirit and purpose of my invention. For example, as the die-recesss $b$ in table C are designed merely to provide means for compelling the dies to move with the table and to enable the workman to place the dies on the table in their proper positions any die-holder that will accomplish this result may be employed. Slight raised ribs on the otherwise plain surface of the table would serve very well. It would be possible also to form the head B integrally with frame A. The water-chamber T may be omitted.

Some other well-known means for converting continuous rotary motion into intermittent rotary motion than that comprised in wheels J J' might be employed. Weights might also be substituted for springs X, $g$, and $g'$ with good results. An ordinary clutch may of course be substituted for tight and loose pulleys for driving, and be shifted by the belt-shifting lever in a well-known way.

I do not wish to cover, broadly, the use of means for refrigerating the dies, as such means have before been employed in machines for molding articles from warm plastic materials. My construction and arrangement of the refrigerating-chambers differ materially, however, from those heretofore in use.

One important advantage of my method of molding is that by removing the molds or dies from the press at once after the momentary heavy pressure has been applied, I am enabled to utilize the press to the utmost, as it does not stand idle for any appreciable length of time, the rapidity with which the pressing operations may succeed each other being limited only by the ability of the workman to supply the filled molds or dies; and one important advantage of my machine is that I am enabled to employ unskilled labor to advantage in removing and opening the molds or dies.

I claim as my invention—

1. The herein-described method of molding articles under pressure from hot or warm plastic materials, which consists in first placing the filled mold or die in the press, then subjecting it momentarily to a heavy pressure, then reducing the pressure, then removing the mold or die from the press while still under this reduced pressure, and then maintaining it under a reduced pressure until the material in the mold is set or hard, as set forth.

2. In a machine for molding articles under pressure from hot or warm plastic materials, the combination of the following instrumentalities—namely, a press for exerting a momentarily heavy pressure on the mold or die, a carrier for carrying the charged mold into and out from said press, a pressure-plate within the press for maintaining the mold under a reduced pressure after the heavy pressure is removed, and a pressure-plate or device adjacent to the press for maintaining a constant pressure on the mold or die until its contents are sufficiently cooled and hard.

3. A machine for molding articles from plastic materials, comprising a rotatively-mounted carrier-table provided with suitable holders for the dies, gearing for imparting an intermittent rotary motion to said table, whereby the dies are brought in succession over a ram or follower, a stationary press-head under which the table moves, a follower arranged under said press-head and table, and mechanism for imparting a reciprocating motion to said follower.

4. A machine for molding articles from plastic materials, comprising a rotatively-mounted carrier-table, C, provided with die-holders with loose bottom plates, $c$, gearing for imparting intermittent rotation to said table, a fixed press-head arranged over said table and provided with a pressure-plate, $e$, and its spring, a ram or follower, F, arranged under said table and press-head, and mechanism for imparting a reciprocating motion to said follower.

5. A machine for molding articles from plastic materials, comprising a rotatively-mounted carrier-table provided with holders for the dies, gearing for imparting intermittent rotation to said table, a press for imparting the requisite pressure to the die while the table is stationary, and a pusher and its operative mechanism for pushing the die off the table while the latter is stationary, as set forth.

6. The combination of a rotatively-mounted carrier-table provided with holders for the dies, gearing for imparting an intermittent rotary motion to said table, a press for pressing a die carried by the table while the table is stationary, a refrigerating-chamber, U, arranged over said table and provided with springs, which keep it pressed down upon the dies, and means for keeping said chamber supplied with water.

7. The combination of the carrier-table C, provided with die-recesses $b$, provided with loose bottom plates, $c$, the spur-wheel J on the axis of said table, the mutilated pinion J' in mesh with wheel J, mechanism for imparting continuous rotary motion to the pinion J', the ram or follower F and its operative mechanism, said follower being arranged under said table, and the press-head B, provided with a spring-pressure plate, $e$, said press-head being arranged over said table and directly opposite to the follower F.

8. The combination of the rotatively-mounted table C, provided with die-holders $b$, the gearing for imparting rotation to said table, the press-head B, arranged over said table, and the roller $l$, mounted on said head B and in the circular path of the said die-holders in the table, substantially as and for the purposes set forth.

9. The combination of the rotatively-mounted table C, provided with die-holders $b$, gearing for imparting intermittent rotation to said table, the pusher mounted in guides over said table and provided with a rod, $u$, the wheel P, provided with a block, $w$, arranged with reference to rod $u$, as set forth, and the retracting-spring $z$ of the pusher.

10. The combination of the table C, rotatively mounted and provided with equallyspaced die-recesses $b$, each having a loose bottom plate, $c$, the wheels J and J', whereby intermittent rotation is imparted to said table, the follower F, arranged under said table, the lever G, cam H and its shaft I, forming the mechanism for actuating said follower, and the press-head B, arranged to project over the table and provided with a spring-pressure plate, $e$, substantially as set forth.

11. In a machine for molding articles from warm plastic materials, the combination, with a horizontally-rotating die-carrying table, of a water-chamber arranged over said table, and the springs above said chamber, whereby it is pressed down upon the dies carried by said table, substantially as set forth.

12. In a machine for molding articles from warm plastic materials, the combination, with a horizontally-rotating die-carrying table, C, of a fixed water-chamber, T, arranged under said table and in close proximity thereto, a movable water-chamber, U, arranged over said table, and the springs above said chamber, whereby the said chamber is pressed down upon the dies carried by the table, substantially as described.

13. The combination, with the belt-shifter, the belt-shifting lever, and the belt-shifting spring attached thereto, of the latch W and its spring arranged with respect to the belt-shifting lever, substantially as set forth, the wheel P, the cam $h'$, carried by wheel P, and the lever Y, interposed between said cam and latch.

14. In a machine for molding articles from plastic materials, the combination, with the carrier-table C and its axis, of the spur-wheel J on the table-axis, the mutilated pinion J' and its shaft, the disk J$^2$ on the table-axis, provided with recesses $w'$, and the segment-disk J$^3$ on the same shaft with pinion J', all arranged to operate substantially as set forth.

In witness whereof I have hereunto signed my name in the presence of two subscribing witnesses.

JOSEPH NAYLOR.

Witnesses:
 HENRY CONNETT,
 J. D. CAPLINGER.